United States Patent [19]

Anderson, III et al.

[11] Patent Number: 4,868,915

[45] Date of Patent: Sep. 19, 1989

[54] KEYLESS ENTRY SYSTEM HAVING REMOTE MARKER FOR MOTOR VEHICLES

[75] Inventors: Philip M. Anderson, III, Chatham, N.J.; James E. Kearney, New Hyde Park, N.Y.; Michael Suchomel, Mountainside; Jeffrey C. Urbanski, Sparta, both of N.J.

[73] Assignee: Allied Corporation, Morristown, N.J.

[21] Appl. No.: 222,335

[22] Filed: Jul. 20, 1988

Related U.S. Application Data

[63] Continuation of Ser. No. 98,724, Sep. 16, 1987, abandoned, which is a continuation of Ser. No. 883,842, Jul. 9, 1986, abandoned, which is a continuation of Ser. No. 582,677, Feb. 23, 1984, abandoned.

[51] Int. Cl.$^4$ .............................................. H04Q 1/00
[52] U.S. Cl. ............................... 340/825.31; 307/10.2; 340/825.69; 340/825.72
[58] Field of Search ................ 340/572, 825.3-825.34, 340/825.69, 825.71, 825.72, 551; 335/296; 361/172; 307/10 AT

[56] References Cited

U.S. PATENT DOCUMENTS

| | | | |
|---|---|---|---|
| 3,891,980 | 6/1975 | Lewis et al. | 340/825.31 X |
| 4,298,862 | 11/1981 | Gregor et al. | 340/572 |
| 4,405,924 | 9/1983 | Shinoda et al. | 340/825.72 |
| 4,484,184 | 11/1984 | Gregor et al. | 340/572 |

Primary Examiner—Ulysses Weldon
Attorney, Agent, or Firm—Ernest D. Buff

[57] ABSTRACT

A keyless entry system has means for defining an interrogation zone. A marker responsive within the interrogation zone to generate a coded signal cooperates remotely with means for disengaging a locking mechanism upon verification of the coded signal when received.

7 Claims, 2 Drawing Sheets

KEYLESS ENTRY SYSTEM HAVING REMOTE MARKER FOR MOTOR VEHICLES

This application is a continuation of application Ser. No. 98,724 filed Sept. 16, 1987, now abandoned, which is a continuation of Ser. No. 883,842 filed July 9, 1986, now abandoned, which is a continuation of Ser. No. 582,677 filed Feb. 23, 1984 now abandoned.

BACKGROUND OF THE INVENTION

1. Field of the Invention

This invention relates to a motor vehicle keyless entry system and an encoded marker used therein; and more particularly, to a keyless entry system that provides a driver, bearing a personally encoded marker, convenient, reliable and quick access to the vehicle's interior.

2. Description of the Prior Art

Keyless entry systems, upon which this invention has improved, are conventionally employed as convenience items with the additional capability of enhanced theft protection. There presently exists three main classes of such keyless entry systems including an infrared system, a radio frequency system and an electronic combination pad.

The infrared system consists of a hand held source module and an infrared sensing and decoder module mounted on the vehicle. When the hand held source module is activated and correctly aimed at the sensor decoder, the frequency or pulse modulated code from the source module is decoded and compared to a preprogrammed code. If both codes match, the door lock mechanism is electronically disengaged allowing entry to the vehicle's interior. This system has several faults, the most problemsome of which is presented by the difficulty encountered by the user in attempting to physically activate the source module while his hands are full or restricted. Once activated, the source module must be correctly aimed, making sure there are no obstructions between the source and sensing module. In foul weather and/or in dimly lit areas, the difficulties of aiming the source module and avoiding obstructions between it and the sensing module are readily apparent. Such obstructions are oftentimes present as snow, dirt, ice and the like. Additionally, in bright light, the sensing module may be incapable of sensing the source module. Yet another fault is presented by the requirement that each of the source and sensing modules have an individual power supply, thereby reducing the reliability of the system.

The radio frequency (RF) system consists of a hand held source module and an RF receiver and decoder mounted on the automobile. The RF system is similar to the infrared system in that the source module must be physically activated; however, the RF source module need not be aimed. When the source module is activated, the receiver transmits the coded RF signal to the decoder. Upon verification of the coded RF signal, the door lock mechanism is disengaged, allowing access to the vehicle's interior. The RF system has disadvantages similar to the infrared system in that the source module must be physically activated (a task made difficult when the user is wearing gloves) and requires its own power source. Still another drawback of the RF system is the tendency of RF interference, generated by motors, radio communicating devices or electrical storms which may jam the receiver or generate false signals that inadvertently disable the lock engaging mechanism.

The third class of keyless entry systems is the electronic combination pad. The electronic combination pad consists of a panel of approximately five buttons (keys) located in the vicinity of the door handle on the automobile. Each of these buttons are usually marked with different symbols. Alternately, the order of a geometric pattern serves the same purpose. When access to the vehicle's interior is desired, the depression of these buttons in a predefined sequence disengages the door locks. One of the disadvantages of the electronic combination pad is presented by the requirement that the buttons be physically activated or depressed. This task is made difficult (1) when the user is wearing gloves, (2) when the keys are obstructed by snow, dirt or ice and (3) when the keypad must be operated in darkness or foul weather. Further, with electronic combination pads, there is a chance that the sequence or combination may be forgotten. As a result, keyless entry systems, though available as options in certain vehicles, have heretofore not gained widespread acceptance by vehicle manufacturers and consumers.

SUMMARY OF THE INVENTION

The present invention provides a keyless entry system that disengages the locking mechanism of a motor vehicle or the like through use of a coded marker which requires no power or physical contact with the vehicle. The marker is of such dimensions that it conveniently fits in a handbag or wallet and may be attached to a key chain. Surprisingly, the marker remains functional while enclosed within these articles (handbag/wallet) requiring only a momentary proximity of such articles to a sensor device disposed on the vehicle.

Generally stated, the keyless entry system of the invention comprises means for defining an interrogation zone. The system has a generating means, including an interrogating coil, for generating a magnetic field having a frequency band within the interrogation zone and a marker, responsive within the interrogation zone to undergo a substantial change in its effective magnetic permeability at preselected frequencies within the frequency band that provides the marker with signal identity. The marker comprises a plurality of strips of magnetostrictive, ferromagnetic material. Each of the strips is adapted to be magnetically biased and thereby armed to resonate mechanically at a different frequency within the frequency band of the magnetic field. The system has a detecting means for detecting resonances of the marker within the interrogation zone and a decoding means for comparing the detected marker resonances against a predefined code to verify parity therebetween. An actuating means connected to the decoding means enables the entry system in response to an indication of parity from the decoding means.

In addition to disengaging the locking mechanism, the keyless entry system of the invention may be electronically interlocked to the ignition of the vehicle, thereby providing added security against theft. Further, the keyless entry system can advantageously be used to actuate electronically operated convenience options such as steering wheel tilt, mirror positions, seat adjustments, radio, suspension, etc. to personalized positions.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

Figure 1:
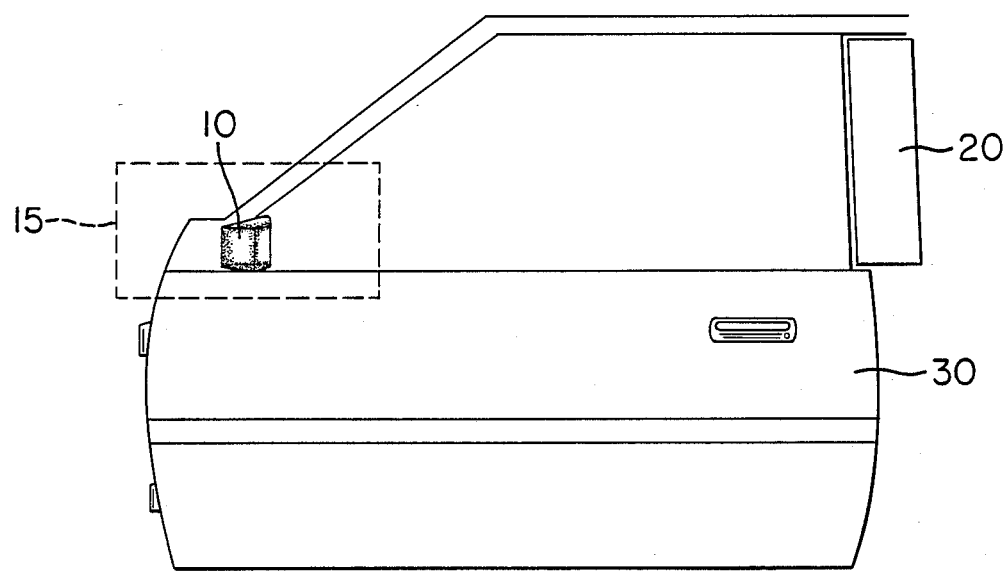
FIG. 1 is a side view of a typical automobile door, including an integral side view mirror and center roof post.

The components of the keyless entry system 150 can be fabricated in a number of diverse sizes and configurations. As a consequence, the invention will be found to function with many varieties of keyless entry systems. For illustrative purposes, the invention is described in connection with an entry system in which an automobile's locking mechanism is disengaged by a person bearing a coded marker to allow quick and convenient access to the interior of the automobile. It will be readily appreciated that the invention can be employed for similar and yet diversified uses, such as keyless remote access to restricted areas and actuation of electronic devices to predetermined conditions. Accordingly, the invention is intended to encompass modifications of the preferred embodiment wherein keyless or remote entry is provided by coded markers.

Referring to FIGS. 1, 2, 3 and 4 of the drawings, there is shown a keyless entry system 150. Preferably, the system 150 utilizes in part the principles taught by P. M. Anderson et al. in application Ser. No. 384,814, now U.S. Pat. No. 4,510,490 filed June 3, 1982, which teaching is specifically incorporated herein by reference thereto. The marker 100 of the system 150 has means for generating a predetermined code. The keyless entry system 150 has means of remotely interrogating the marker 100 and regenerating the predefined code contained therein. The detecting means 120 has means of determining whether the regenerated code is the correct code required to disengage the automobiles locking mechanism 130. A person bearing a coded marker 100, upon entering interrogation zone 15 provided by antenna 110, activates the keyless entry system 150 via proximity sensor 115. Sensor 115 can be any conventional proximity sensor adapted to undergo a change in electronic status in response to the presence of an object proximate thereto. Such objects can include the hand, keys or marker of the user. A variety of proximity sensors are commercially available, including those known as magnetic, capacitive, inductive, acoustic and the like. Capacitive proximity sensors detect a wide variety of objects and require minimal power. Accordingly, such sensors are preferred. The proximity sensor 115 requires minimal energy compared to the system 150. It activates system 150 only when an object is within the interrogation zone 15. This condition is assured by locating the proximity sensor 115 within the interrogation zone 15. Accordingly, its use eliminates the energy loss otherwise created by the requirement that system 150 continuously scan the interrogation zone 15. Upon being activated by proximity sensor 115, a generating means 170 interrogates the marker 100, causing it to reproduce the code contained therein. The detecting means 120 detects the code and transmits it to a decoding means 140 which compares the code against a predefined code to verify parity therebetween. An actuating means 145 enables keyless entry system 150 by disengaging the locking mechanism 130 in response to an indication of parity from the decoding means 140.

The marker 100 is designed in such a manner as to allow numerous codes to be represented. The construction of these markers is disclosed in the aforesaid patent application of Anderson et al., which disclosure is incorporated herein by specific reference thereto. However, it should be noted that all such coded markers are visually indistinguishable from one another. The marker's configuration is such that it may readily be attached to a key chain or inserted in a handbag or wallet. More importantly,, the marker 100 remains operational while it is enclosed in a handbag or wallet.

Figure 2:
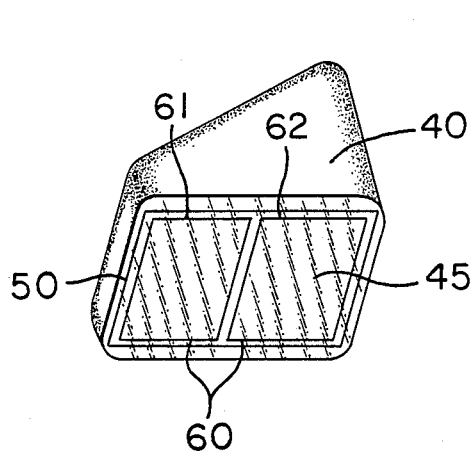
FIG. 2 is an enlarged perspective view of the side view mirror of FIG. 1 incorporating the antenna of the present invention.

The antenna system 110 is responsible for defining the interrogation zone 15. Preferably the antenna are conveniently located on the automobile. FIG. 1 shows two possible locations for the antenna system 110 on an automobile. The integral side view mirror 10 on the driver's door 30 is ideally suited for the antenna system 110 since it is conveniently located. FIG. 2 depicts an enlarged view of the integral side view mirror with the antenna system 110 installed. The antenna system 110 consists of two interrogation coils 60 and a receiving coil 50 mounted coplanar to each other. The integral side view mirror 10 consists of two main parts, the aerodynamic shell 40 and the mirror 45. The coplanar antenna system 110 can easily be installed directly behind the mirror 45 in the space provided by the aerodynamic shell 40. This arrangement allows the antenna system 110 to be completely concealed while at the same time providing a well defined interrogation zone 15.

In operation, the generating means 170 energizes the interrogation coils 60 producing a magnetic field of a predefined frequency spectrum. This magnetic field is distributed throughout the interrogation zone 15, thus serving to activate any marker 100 entering the interrogation zone 15. Once a marker 100 enters the interrogation zone 15, the receiving coil 50 accepts the coded signal generated by the activated marker 100 and transmits the coded signal to the detecting means 120. The decoding means 140 then verifies the code by comparing a predefined internal code with the detected code. Upon verification of parity, the actuating means 145 enables the entry system 150 to disengage the locking mechanism 130. The keyless entry system 150 is powered by the automobile's battery. However, the system 150 is energized only when the proximity sensor 115 is triggered. The keyless entry system 150 may be positioned in any convenient location within the automobile's interior. The system 150 requires no major alterations of the automobile, and thus enables the keyless entry system 150 to become an easily installed option.

In a preferred embodiment of the invention, interrogating coil 60 comprises a pair of antenna coils 61,62 disposed adjacent to each other. Antenna coils 61,62 are driven by the generator means 170 alternately at phase angles of 0° and 180° with respect to each other. This arrangement of the antenna coils 61,62 permits detection of marker 100 independent of its orientation within interrogation zone 15.

Figure 3:
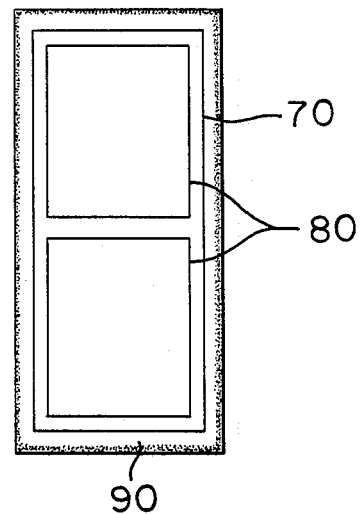
FIG. 3 is an enlarged side view of the roof post of FIG. 1 incorporating an alternative antenna of the present invention.
Figure 4:
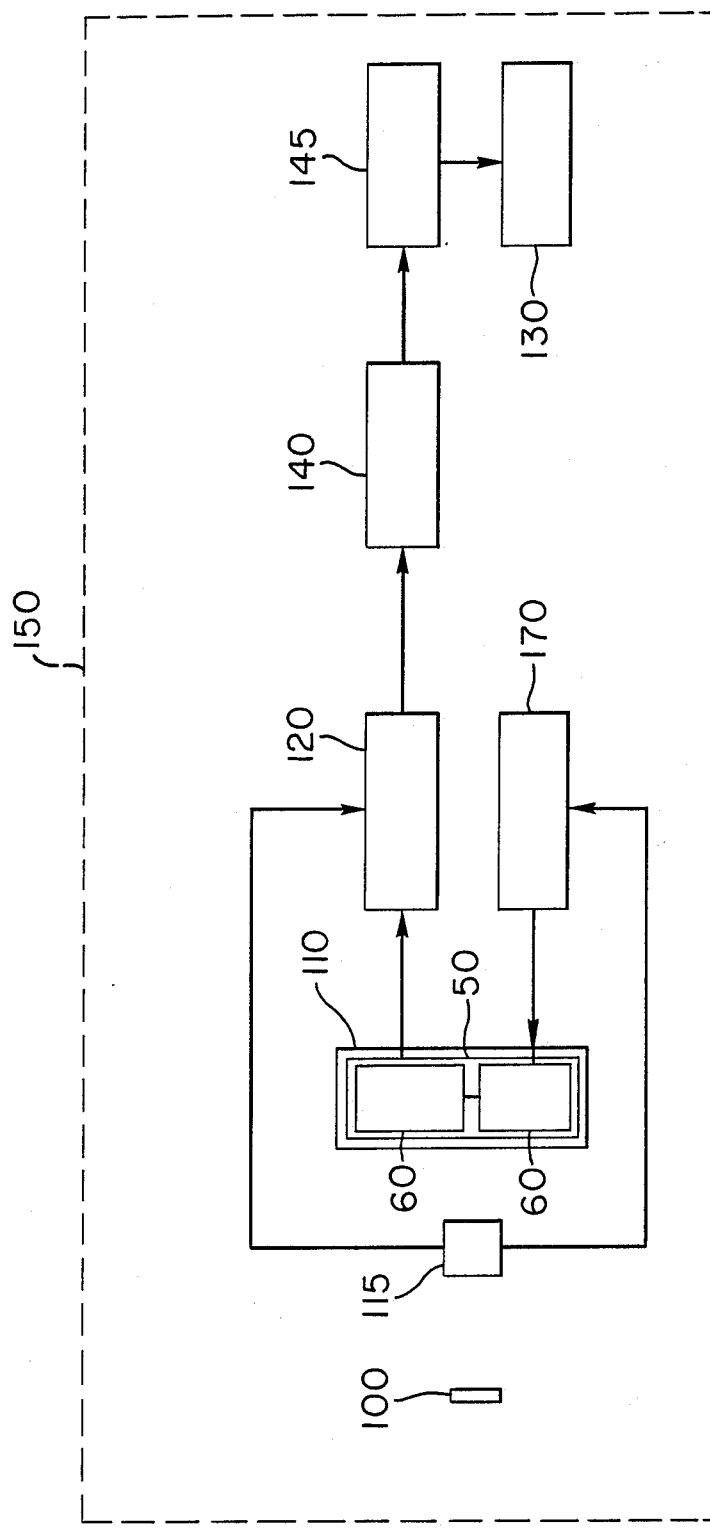
FIG. 4 is a block diagram of the keyless entry system of the invention

There are several alternate antenna system 110 locations which provide a variety of convenient interrogation zones. One such alternate location is depicted in FIG. 1 as the center roof post 20. Many automobiles have decorative panels over the center roof post 20 in which the antenna system 110 can easily be installed, as depicted in FIG. 3. The decorative panel 90 has the two interrogation coils 80 and a receiving coil 70 implanted on the hidden side, thus forming a concealed and convenient interrogation zone. A few other antenna system 110 locations include implantation of such systems directly in or on conveniently located window glass. With the current trend towards nonmetallic autobody parts, such antenna systems 110 can be installed directly under door panels 30 or similar conveniently located autobody parts.

The applications of the keyless entry system 150 need not be limited to locking mechanisms. With the deployment of personalized markers, any electronically actuated device may be adjusted to personal specification by correlating the personalized marker's code to the personal adjustment specifications. This does not restrict access to the automobile's interior since only a portion of the code is required to activate the locking mechanism and the remaining code can be designated to personal adjustments. A brief list of electronically actuated devices includes seat adjustments, radio settings, mirror positions, steering wheel tilt, suspension adjustments, etc.

Having thus described the invention in rather full detail, it will be understood that such detail need not be strictly adhered to, but that various changes and modifications may suggest themselves to one skilled in the art, all falling within the scope of the invention as defined by the subjoined claims.

What is claimed is:

1. A keyless entry system, comprising:
   (a) a means for defining an interrogation zone;
   (b) generating means for generating a magnetic field having a frequency band within said interrogation zone, said generating means including an interrogating coil;
   (c) activating means for detecting the presence of an object within said interrogation zone and activating said generating means in response to the presence of said object;
   (d) a marker responsive within said interrogation zone to undergo a substantial change in its effective magnetic permeability at preselected frequencies within said frequency band that provides the marker with signal identity, said marker comprising a plurality of strips of magnetostrictive, ferromagnetic material, each of said strips being adapted to be magnetically biased and thereby armed to resonate mechanically at a different frequency within the frequency band of said magnetic field;
   (e) detecting means for detecting resonances of said marker within said interrogation zone, said detecting means comprising an antenna coil and said interrogating coil and said antenna coil being coplanar;
   (f) decoding means for comparing said detected marker resonances against a predefined code to verify parity therebetween; and
   (g) actuating means for enabling said entry system in response to an indication of parity from said entry system in response to an indication of parity from said decoding means.

2. A keyless entry system as recited in claim 1, wherein said activating means comprises a proximity sensor disposed in the vicinity of said interrogation zone and adapted to undergo a change in electronic status in response to the presence of an object proximate thereto, and switching means for energizing said generating means in response to said change in electronic status.

3. A keyless entry system as recited in claim 1, wherein said generating means comprises a pair of antenna coils disposed adjacent to each other and driven by said generating means alternately at phase angles of 0° and 180° with respect to each other.

4. A keyless entry system as recited in claim 1, wherein said system is disposed in a motor vehicle and said antenna coils of said generating and detecting means are disposed in a side rear view mirror of said vehicle.

5. A keyless entry system as recited in claim 4, wherein said mirror is disposed on the driver side of said vehicle.

6. A keyless entry system as recited in claim 1, wherein said system is disposed in a motor vehicle having a nonmetallic center roof post decorative panel and said antenna coils of said generating and detecting means are disposed in said decorative panel.

7. A keyless entry system as recited in claim 1, wherein said system is disposed in a motor vehicle having a nonmetallic body part in the vicinity of said door and said antenna coils of said generating and detecting means are disposed in said nonmetallic body part.

* * * * *